Aug. 18, 1931.  R. BAADER  1,819,060
MACHINE FOR SPLITTING OPEN, CLEANING, AND BONING FISH
Filed Dec. 17, 1929  3 Sheets-Sheet 1
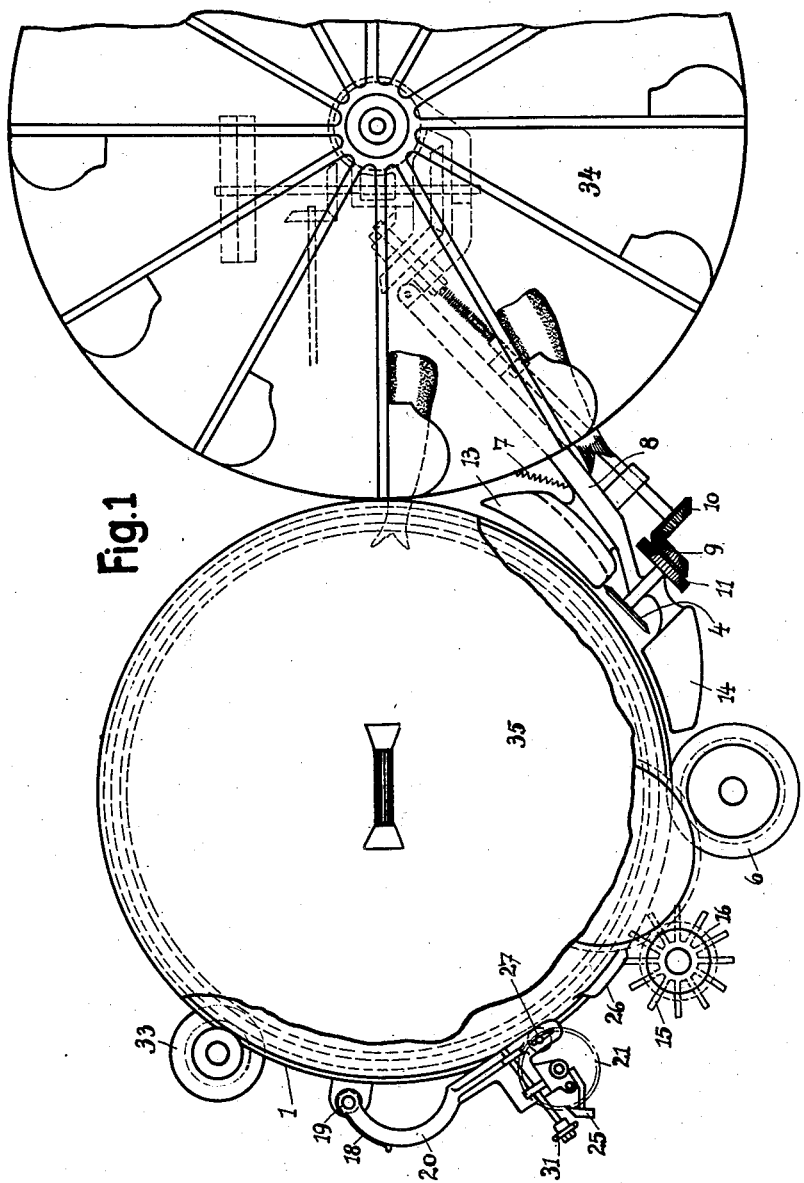

Aug. 18, 1931.  R. BAADER  1,819,060
MACHINE FOR SPLITTING OPEN, CLEANING, AND BONING FISH
Filed Dec. 17, 1929  3 Sheets-Sheet 2
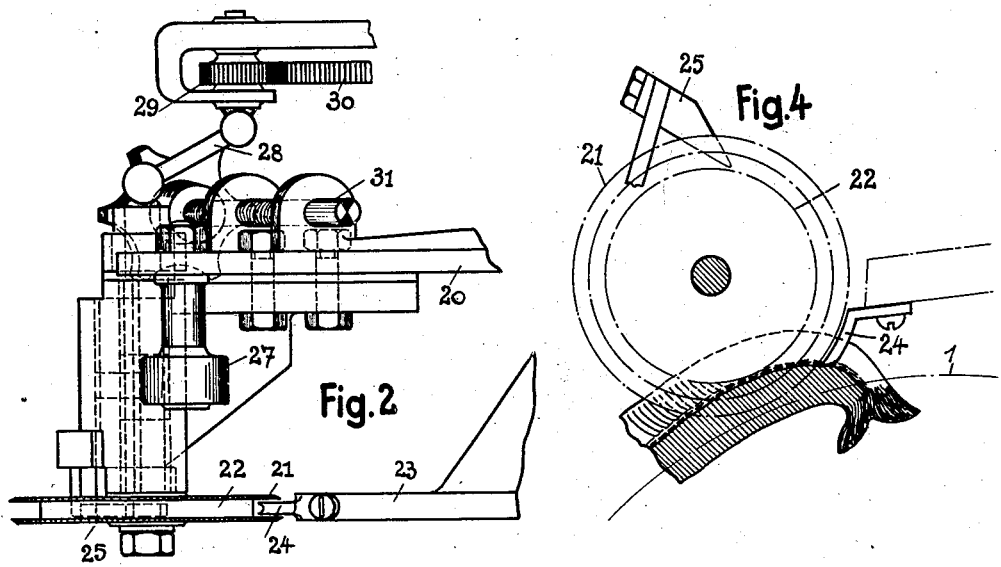
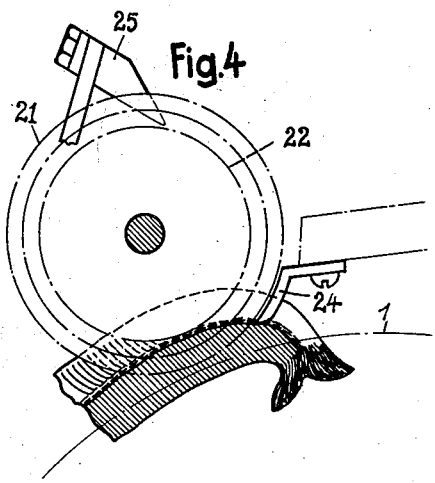
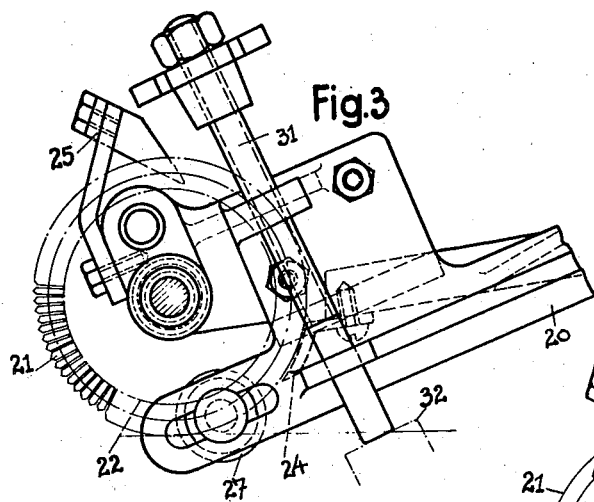
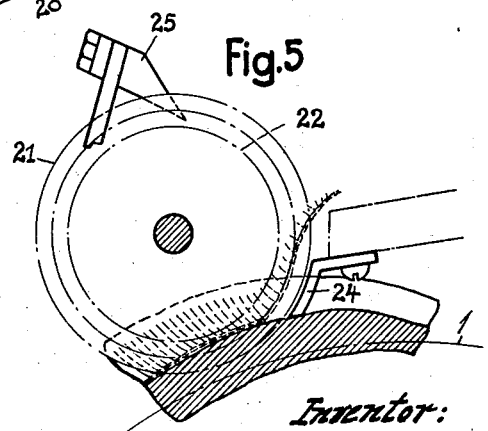

Aug. 18, 1931.  R. BAADER  1,819,060
MACHINE FOR SPLITTING OPEN, CLEANING, AND BONING FISH
Filed Dec. 17, 1929   3 Sheets-Sheet 3

Inventor:
Rudolph Baader
by Raul Schilly, Attorney

Patented Aug. 18, 1931

1,819,060

UNITED STATES PATENT OFFICE

RUDOLPH BAADER, OF LUBECK, GERMANY

MACHINE FOR SPLITTING OPEN, CLEANING, AND BONING FISH

Application filed December 17, 1929, Serial No. 414,651, and in Germany January 7, 1929.

This invention relates to a machine for cutting open, cleaning and boning fish, more particularly herrings which may be treated either in fresh state or salted. In this machine the decapitated fish is cut open, cleaned and boned, a horizontally revolving plate disc being used therefore, around the periphery of which the several tools are arranged.

The known tools serve to cut open the belly of the fish, to remove the intestines from the belly cavity, to remove the black skin from the surface of the belly cavity, and to detach and remove the back bone. Although such tools have been used for treating fish, it has not become known that they failed to work properly, in which case the material treated would collect at the point of failing and clog the machine. It is nevertheless possible, owing to the differences in the material being worked, that the fish is torn or miscuts occur, i. e. that the knives penetrate into the fish at the wrong points, as the tools, owing to incorrect shape or arrangement, do not adapt themselves to all parts of the work, and as it is necessary to remove the fine stomach bones or ribs at the same time as the back bone.

These disadvantages of the known tools for cutting open, cleaning and boning fish are entirely overcome by the invention in that the cutting open of the fish belly is effected by means of two known disc-knives operating like shears, which knives cooperate with a guiding cheek oscillatably connected therewith in such a manner that the section of the belly to be cut off is always of the same width, that after the cutting open also of the tail part, the removal of the black skin is effected by means of a rotating tool provided with roughened, serrated or similar surfaces, which tool penetrates into the cavity of the belly, two resilient discs or the like effecting a counter pressure, and that the removing of the back bone together with the thin belly and back flesh bones is effected by a tool disc with teeth projecting on each side beyond its circumference in such a manner that the teeth of the tool disc, rotating in opposite direction as the rotating plate disc which guides the fish, penetrate into the back flesh of the fish on both sides of the back bone, the rib bones engaging with the gaps between teeth, and after the back bone has been cut off at the root of the tail, are gripped by the teeth and pulled out of the flesh together with the back bone, whereas the circumference of the tool disc rotates along and on the inner surface of the back bone, whereupon the boned fish can be cut into two so called fillets by a following disc knife.

An embodiment of the invention is illustrated by way of example in the accompanying drawings in which:—

Fig. 1 is a top plan view of the whole of the machine.

Fig. 2 shows on a larger scale in side elevation the tool for removing the back bone and belly bones.

Fig. 3 is a top plan view of Fig. 2.

Fig. 4 illustrates the cutting through of the back bone.

Fig. 5 illustrates the pulling out of the back bone.

Figure 12:
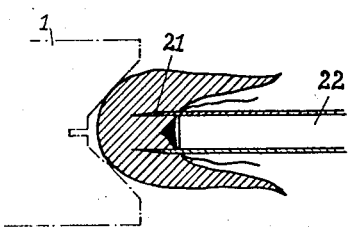
Figure 11:
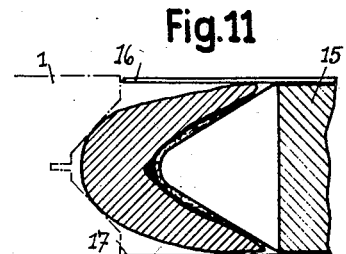
Figure 13:
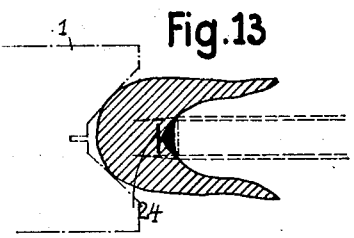
Figure 14:
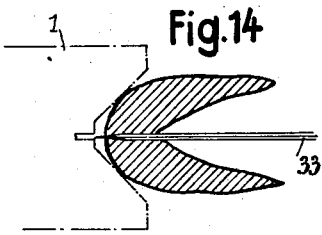

Fig. 11 the cleaning of the belly cavity,

Fig. 12 the cutting free of the back bone,

Fig. 13 the undercutting of the back bone,

Fig. 14 the filleting.

Figure 15:
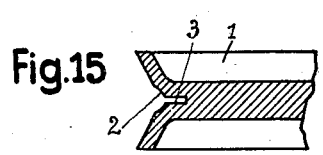

Fig. 15 is a vertical cross section through the plate disc.

The machine consists of a horizontal rotating plate disc 1, such as is known in fish treating machines, the flat outwardly directed edges of which form an obtuse angle, and of a rotating frame 34 feeding the fishes singly to the tools. In the circumference of disc 1 a groove 2 is provided which has a notch 3 to allow the knife to attain the necessary cutting depth.

Figure 6:
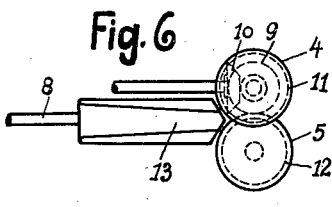
Fig. 6 shows the shearing knives for cutting off the stomach strips, in side elevation.
Figure 7:
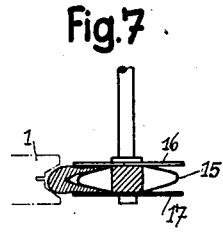
Fig. 7 is a vertical cross section of the tool for cleaning the belly cavity.
Figure 9:
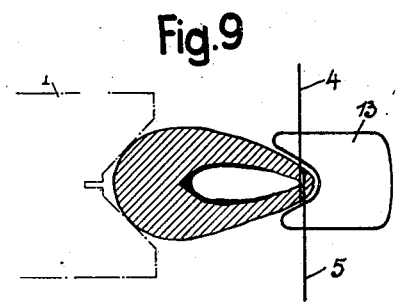
Fig. 9 shows the cutting off of the stomach strip.
Figure 8:
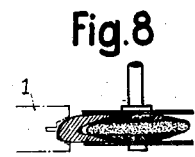
Fig. 8 shows another form of construction of the tool for cleaning the belly cavity.
Figure 10:
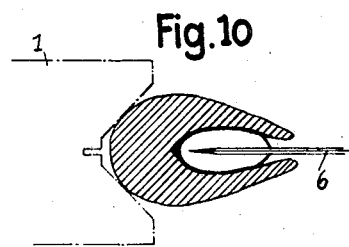
Fig. 10 illustrates the cutting open of the tail portion.

Around the circumference of the disc 1 the tools for cutting open, cleaning, boning and filleting the fish are arranged and driven by spur wheels covered with a removable metal hood 35 Fig. 1. Two shears-shaped disc knives 4, 5 and a horizontally rotating disc knife disc 6 serve for cutting open the fish held by the tail fin in a known clamp and situated with the back in the groove 2 of disc 1. The two knives 4, 5 are mounted on an oscillatably mounted arm 8, controlled by a spring 7, and they are driven by means of bevel wheels 9, 10 and spur wheels 11, 12. A guide cheek 13 is rigidly mounted on the arm 8 and has an incision of V-shaped cross-section in which the belly of the fish engages so that the front belly edge lies in the vertex of the incision. The guide cheek 13 is movable in opposition to the action of the spring 7 according to the width of the fish, in swinging out the arm 8, so that any fish can easily pass through. The knives 4, 5 always cut off in uniform width the belly with the fins, which is lying in the vertex of the incision (Fig. 9), as the shear knives 4, 5 swing out together with the guide cheek 13 in accordance with the width of the fish, so that the position of the knives 4, 5 always remains in the same relation to the incision of the guide cheek 13. A guide 14 is also mounted on the arm 8, by means of which the fish is moved, when circulating with the plate disc 1, against the horizontal rotating knife 6 so that it is surely cut, which knife cuts open the fish from the tail root to the anus, the belly cavity of the fish having already been opened by the knives 4, 5 (Fig. 10). The fish is now cut open along its whole length, so that the belly cavity is accessible and the back bone is exposed on its entire length. A vane wheel 15 is arranged behind the knife 6. The working edges of the V-shaped vanes are roughened, serrated or the like, and above and below the vanes a resilient disc 16, 17 respectively is arranged which, when the vanes penetrate into the belly cavity of the fish, exert a counter pressure on the belly flaps so that the rough edges of the vanes rub strongly along the inside of the belly cavity and grip and tear out the black skin (Figs. 7 and 11). According to Fig. 8 the tool for cleaning the belly cavity consists of an elliptic disc made of corundum or of an aggregate thereof, such as emery, the working surfaces of which are also rough.

For loosening and removing the back bone from the fish a toothed disc 22 is provided, which is pivotally mounted on the pin 19 of an arm 20 loaded by a spring 18, the teeth 21 of said disc being preferably of ogival shape and sharp pointed and project in ringshape on both sides beyond the periphery of the disc. Approximately in the same plane with the points of the teeth 21 a knife 24 is adjustably mounted on a bar 23 rigidly connected with the arm 20, the width of this knife corresponding to the space between the two toothed rings and the front edge of which is sharpened (Figs. 2 and 3). Between the two toothed rings a wedge-shaped tool 25 is also fitted (Figs. 2 and 3).

The toothed disc 21, 22 is guided by a cam 26 mounted on the circumference of the plate disc 1, on which cam a roller, adjustably mounted on the arm 20, runs, thereby lifting the toothed disc 21, 22 whilst the fish tail is passing from the circumference of the plate disc 1 and after the cam 26 has passed is thrown back into the operative position under the action of the spring 18 into the arm 20, so that the teeth 21 penetrate into the back flesh of the fish accurately at the bending point of the tail root on both sides of the back bone, the sharp edge of the knife 24 cutting through the back bone at the tail root (Fig. 4). A short portion of the back bone remains in the tail root so as to preserve a rigid connection between the tail fin held by a clamp (not shown in the drawings) and the trunk of the fish which is to be further treated, tearing off of the tail fin being thus prevented.

The teeth 21 penetrate with their sharp point deeply into the back flesh of the fish, causing the belly bones or ribs, as also the other thin bones situated in the back flesh, to engage in the tooth gaps (Fig. 12). The tooth disc 21, 22 is driven by means of an articulated shaft 28 and spur wheels 29, 30 (Fig. 2), and its revolving speed is approximately the same as that of the plate disc 1. The circumference of the disc 22 rolls at the movement of the fish on the inner surface of the back bone so that during the boning, which requires the overcoming of considerable resistances, the fish is held under a strong pressure against the circumference of the plate disc 1 and its movement is at the same time assisted (Fig. 5). Owing to the fact that the disc 22 bears against the back bone, the cutting depth of the teeth is at the same time regulated (Fig. 12). When the knife 24 has cut through the back bone, it is situated between the back bone and the back flesh (Figs. 5 to 13). The teeth 21, as they push the belly bones into the tooth gaps, expose the back bone at the sides, whereas the knife 24 cuts under the back bone. The teeth 21 of the tooth disc 21, 22 exert a pulling movement on the back bone as, whilst the fish is being carried along by the plate disc 1, the back bone slips between the tooth rings and the knife 24, as the teeth 21 exert a pulling action on the rib bones and the other fine bones connected with the bone trunk, and any parts of bones which remain adhering to the teeth are forced out by the tool 25.

The adjusting screw 31, bearing against a stop 32 mounted on the stationary machine frame, serves for adjusting the pressure of the disc 22 onto the back bone for a weaker or stronger pressure (Fig. 3).

Whilst the bone trunk, which has been peeled out, that is the back bone with the fine belly- and back-flesh bones connected therewith, is thrown out by the tool 25, the boned fish travels on. Behind the tooth disc a pivotally mounted horizontally rotating plate knife 33 is also arranged, the edge of which extends up to the notch 3 of the disc 1. The cleansed and boned fish can be cut along its longitudinal centre by means of this knife 33, whereby two fillet halves are obtained (Fig. 14).

The machine above described works the fish from the tail end. If suitably modified, the machine can naturally be arranged so that the fish is cut open, cleansed and boned from the head end.

I claim:—

1. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish and a stationary knife arranged behind the toothed disc to undercut the back bone and free the same for removal by said toothed disc.

2. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating vane wheel having a roughened V-shaped working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish and a stationary knife arranged behind the toothed disc to undercut the back bone and free the same for removal by said toothed disc.

3. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinaly near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, a swiveled arm on which said toothed disc is rotatively mounted, and means for maintaining the arm with the toothed disc in operative relation to fish held by the carrier.

4. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, the said teeth having ogival sharp pointed teeth forming rings, one of which is on each side of and extends beyond the periphery of said disc.

5. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, the said teeth projecting beyond the periphery of the disc and forming rings, and a knife mounted in operative relation to the periphery of the disc and projecting between the rings, the said knife having an end cutting edge for penetrating the back bone of the fish at the root of the tail.

6. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, the said teeth projecting beyond the periphery of the disc and forming rings, the relation of parts being such that the periphery of the disc bears against and rolls on the back bone of the fish to press the fish firmly against the aforesaid rotating carrier, and a knife mounted in operative relation to the periphery of the disc and projecting between the rings, the said knife having an end cutting edge for penetrating the back bone of the fish at the root of the tail.

7. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, a knife projecting between the teeth of the disc and operative to cut through and under the back bone to facilitate the removal of the aforesaid bones by the toothed disc.

8. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, a knife projecting between the teeth of the disc and operative to cut through and under the back bone to facilitate the removal of the aforesaid bones by the toothed disc, and a stationary tool projecting between the rings of teeth for dislodging the bones carried by the teeth.

9. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a horizontally rotative knife for slitting the fish longitudinally near the tail end as the carrier rotates, a rotating tool having a roughened working edge whose periphery projects into the belly of the fish for operating on the surface of the belly cavity, resilient discs coacting therewith for exerting a pressure externally on the fish, a toothed disc operative to remove the back bone together with the thin belly and back-flesh bone of the fish, a knife projecting between the teeth of the disc and operative to cut through and under the back bone to facilitate the removal of the aforesaid bones by the toothed disc, a stationary tool projecting between the rings of teeth for dislodging the bones carried by the teeth, and a disc having knives projecting peripherally from its sides and located in position to operate on the fish after the boning action has occurred for cutting the fish into two fillet portions.

10. A machine for cutting open, cleaning and boning fish comprising in combination a rotating carrier for holding fish with their bellies outward, a guiding cheek for holding the fish on the carrier, rotatively mounted coacting disc knives set at an angle to which fish are moved by the carrier and operative to cut open the fish belly, a pivotally mounted arm supporting the guiding cheek and said knives, a rotating tool having a roughened working edge whose periphery projects into the belly of the fish for operating on the surface of the belly cavity, a toothed disc operative to remove the back bone together with the thin belly and back-flesh bone of the fish and a stationary knife arranged behind the toothed disc to undercut the back bone and free the same for removal by said toothed disc.

In testimony whereof I affix my signature.

RUDOLPH BAADER.